United States Patent [19]

Gonser

[11] 4,443,494

[45] Apr. 17, 1984

[54] METHOD FOR JOINING OBJECTS

[75] Inventor: Donald I. Gonser, York, Pa.

[73] Assignee: Dentsply Research and Development Corporation, Milford, Del.

[21] Appl. No.: 462,818

[22] Filed: Feb. 1, 1983

Related U.S. Application Data

[63] Continuation-in-part of Ser. No. 234,473, Feb. 17, 1981, abandoned, and a continuation-in-part of Ser. No. 276,656, Jun. 23, 1981, abandoned.

[51] Int. Cl.³ .............................................. B05D 3/06
[52] U.S. Cl. ...................................... 156/64; 156/180; 156/275.5; 445/3; 445/27; 427/54.1; 264/1.4; 264/22; 264/261
[58] Field of Search .................. 427/44, 54.1; 156/272

[56] References Cited

U.S. PATENT DOCUMENTS

| 3,351,603 | 11/1967 | Chen et al. | 204/159.16 |
| 3,395,069 | 7/1968 | Plueddemann | 156/272 |
| 3,398,084 | 8/1968 | Plueddemann | 156/272 |
| 3,398,210 | 8/1968 | Plueddemann et al. | 260/29.6 RB |
| 3,418,301 | 12/1968 | Spivey . | |
| 3,424,638 | 1/1969 | Marans | 156/272 |
| 3,450,613 | 6/1969 | Steinberg | 204/159.15 |
| 3,702,275 | 11/1972 | Hooker | 156/174 |
| 4,073,777 | 2/1978 | O'Neil et al. | 204/159.16 |
| 4,082,635 | 4/1978 | Fritz et al. | 427/54.1 |
| 4,119,681 | 10/1978 | Veselovsky et al. | 204/159.15 |
| 4,134,814 | 1/1979 | De Poortere et al. | 204/159.15 |
| 4,201,618 | 5/1980 | Lewis | 156/272 |

Primary Examiner—John H. Newsome
Attorney, Agent, or Firm—Woodcock, Washburn, Kurtz, Mackiewicz & Norris

[57] ABSTRACT

Methods for accurately joining objects, especially optical objects, are disclosed comprising contacting the objects with light curable composition, causing light to transit at least one of the objects, evaluating the light, positioning the objects in response to the evaluation and irradiating the composition to harden it, thus to fixedly maintain a preselected spatial orientation among the objects.

24 Claims, 8 Drawing Figures

METHOD FOR JOINING OBJECTS

BACKGROUND OF THE INVENTION

This application is a continuation in part of Ser. No. 234,473 filed Feb. 17, 1981 and a continuation in part of Ser. No. 276,656 filed June 23, 1981 both now abandoned.

FIELD OF THE INVENTION

This invention is directed to manufacturing and other processes employing certain classes of demand settable adhesives. More particularly, this invention relates to processes for fixturing, assembling, repairing, and otherwise operating upon articles especially fiber optic devices with such adhesive compositions which are polymerizable upon demand using actinic light.

In the manufacturing of articles, it is frequently necessary to cause two or more objects to be joined together in a preselected spatial orientation. Frequently, it is also necessary to ensure that such spatial relationship is accurate to a high tolerance. Such accuracy may be demanded, for example, in optical, electronic, acoustic, mechanical and other systems where the spatial relation or "alignment" may be critical to proper operation, performance and control of the resulting articles. Such criticality is especially evident in optical and electro-optical articles such as optical scanning, viewing and detecting devices; lasers; vacuum tubes; fiber optic devices; lamp filament positioning, and many others. Those skilled in the art will readily appreciate the necessity for precise alignment of such systems. Such persons will also recognize that present processes for accomplishing such alignment are relatively inefficient and costly and that, accordingly, new processes and methods for accomplishing this goal are highly desired.

It is especially desired to provide improved processes and materials for the production of fiber optics and similar devices. Those skilled in the art will appreciate that, at present, processes for such production are relatively inefficient. Thus, according to one common means of bonding optical fibers, fiber optic bundles or arrays, thermally curable or autocatalytic epoxy resins are employed. The use of such materials necessitates a lengthy period of time in which the bundle elements must be held mechanically while the epoxy material cures. Additionally, when curing at elevated temperatures is required, problems may be encountered due to the change in resin viscosity with such elevated temperatures. Such change may result in a tendency of the material to run, droop or "wick" away from its intended location. The present materials and processes overcome these shortcomings.

It has also been desired to provide means of repairing optical, electro-optical, and other systems in a fashion which is suited to the preservation of alignment and to the maintenance of desired optical, acoustic, and other physical properties.

OBJECTS OF THE INVENTION

It is an object of this invention to provide processes for the joining of objects together while maintaining among such objects a preselected spatial relationship or orientation. It is a further object to provide processes for the repair of objects while maintaining the alignment thereof. A further object is to provide fixturing, assembling, repairing, and other processes for articles, which processes are adapted to the maintenance of desired optical, electronic, acoustic, and other physical properties of such articles. It is also desired to furnish such processes which are efficient and cost effective. Yet another object is to provide such processes which employ certain preferred demand settable adhesives which are polymerizable using actinic light. Yet another object is to provide materials and processes for the fabrication of fiber optic devices and bundles which are superior to those presently known. These and other objects may be accomplished by the use of one or more embodiments of this invention.

SUMMARY OF THE INVENTION

It has been found that rapid, efficient, and effective fixturing of pluralities of objects may be accomplished employing certain demand settable adhesives using actinic light. More particularly, a process for fixturing a first object relative to a second object has been found comprising the steps of contacting said first object and said second object with at least one portion of an actinic light polymerizable composition, positioning said objects relative to each other to attain a preselected spatial orientation among them, and irradiating said portion with actinic light for a period of time sufficient to cause substantial polymerization of the composition thereby fixedly maintaining said orientation. The actinic light polymerizable compositions may comprise binder resin, a diluent monomer and a photosensitizing system. The sensitizing system is either a combination of an alpha diketone and an amine or an alpha diketone, an amine and a benzoin alkyl ether. The actinic light is, accordingly, selected to be either visible and/or ultraviolet in frequency.

Preferred processes in accordance with this invention join together a first and second object by contacting them with at least one portion of an actinic light hardenable composition. Light is then caused to transit at least one of the objects either through transmission from an external light source or through emanation from one of the objects itself. The transited light is then evaluated for intensity, coherency, phase, color or other quality by causing the transiting light to contact a light detection or evaluation means. Alternatively, and preferably, the light may be evaluated for geometry with respect to one or more of the objects. The objects are then positioned relative to each other in response to the evaluation of the transiting light. When a preselected spatial orientation of the two objects has been attained as ascertained through the evaluation of the transiting light, the actinic light hardenable material is irradiated with actinic light for a time sufficient to cause the substantial hardening of the composition thus to maintain the preselected spatial orientation to a high degree of accuracy.

In accordance with a preferred embodiment, bulb and base portions of a lamp are joined to provide proper alignment of emanating light with respect to the base. In another preferred embodiment, optical fibers or waveguides are joined together in a fashion which minimizes signal loss due to the junction.

Additionally, it has been found that such actinic light polymerizable compositions may be employed to modify or repair waveguides or waveguide arrays. Accordingly, this invention provides a method for the repair of a waveguide array having a structural void on the surface thereof comprising the steps of applying to said void an actinic light polymerizable composition and exposing said composition to actinic light for a period of time effective to polymerize said composition thus to fill the void.

DETAILED DESCRIPTION OF THE INVENTION

Figure 1:
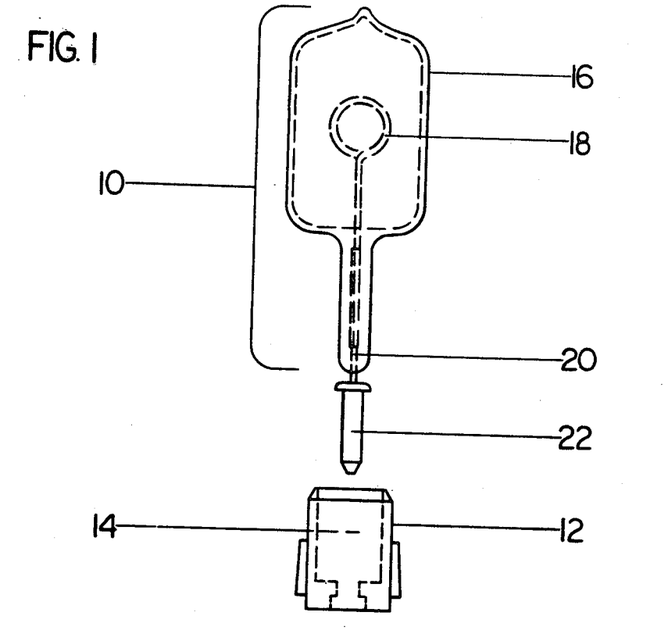
FIG. 1 is an exploded view of an incandescent lamp such as is used in projection and other devices.
Figure 2:
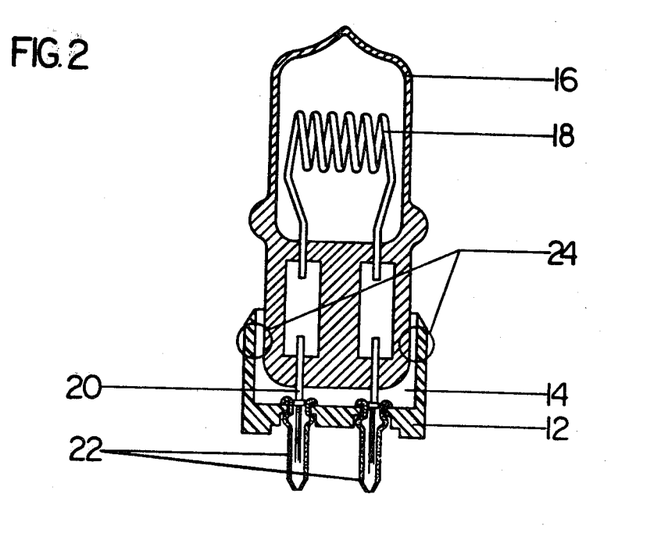
FIG. 2 shows the lamp preparatory to alignment.

The fixturing processes of this invention are conveniently illustrated by reference to the drawings. FIG. 1 illustrates an incandescent lamp as a "blow-up" of its subassemblies. Thus, the lamp may be viewed as comprising an envelope bulb unit 10 and a base assembly 12 having a cavity 14 for the insertion of the bulb. FIG. 2 shows a different view of the lamp of FIG. 1 after the bulb and base subassemblies have been conjoined. Thus, the bulb comprises a glass envelope 16, a filament 18, leads 20 and contact pins 22. It is frequently necessary to effect a precise optical alignment between the filament 18 via the bulb 16 and the base 12. A portions of an actinic light polymerizable composition 24 in in contact with both the bulb and the base. Subsequent positioning of the base 12 and the bulb 16 relative to each other is performed to attain a preselected spatial orientation thereof. Irradiation of the polymerizable composition with actinic light for a time sufficient to cause polymerization of this composition results in the fixed maintenance of the spatial orientation. These figures demonstrate the use of discrete portions of an actinic light polymerizable composition to effect the fixturing of the lamp. Following this fixturing, it is possible to employ additional quantities of cementing, filling, or adhesive compositions further to fill the cavity 14 and to provide a firmer bond between the bulb and base. It is also within the scope of this invention to employ amounts of actinic light polymerizable compositions which are sufficient to fill fully the cavity 14 and thus, firmly to bond the lamp subassemblies in one step.

Figure 3:
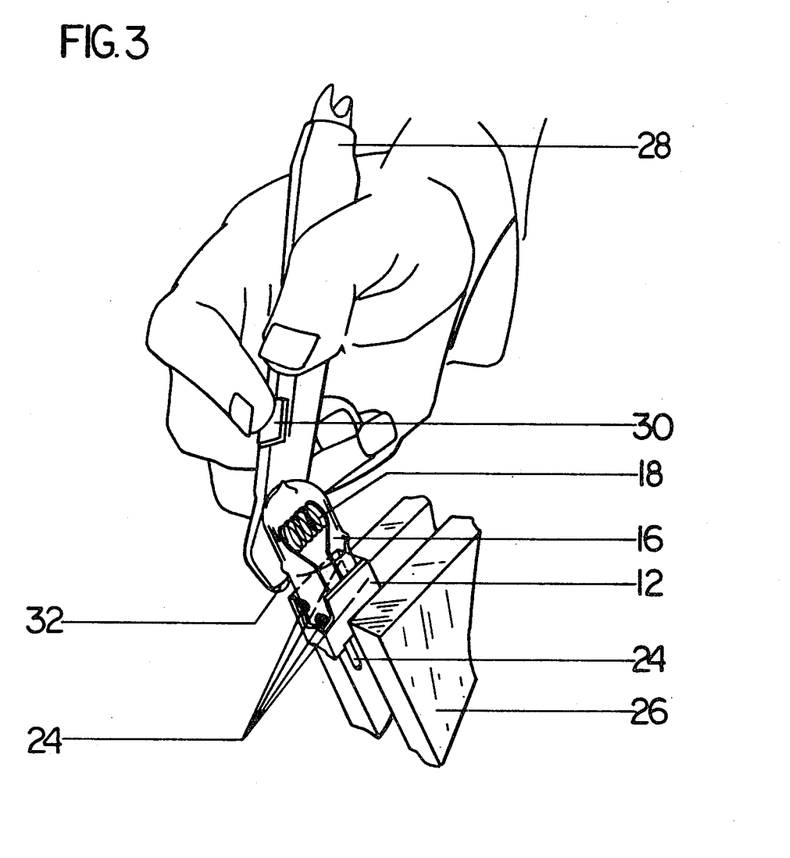
FIG. 3 illustrates the lamp of FIG. 2 in the process of being fixtured according to certain of the processes of this invention.

FIG. 3 depicts a preferred procedure for fixturing such a lamp of FIGS. 1 and 2 according to this invention. Thus, the bulb 16 and base 12 are placed in close proximity to each other and preferably held, for example, in a clamp 26. Portions of actinic light polymerizable composition 24 are placed in contact with both the bulb and the base which are then positioned relative to each other to attain a preselected spatial orientation. A light source 28 preferably having an activating means 30, is positioned so that light can be directed through a light exit port 32 toward the composition 24. The light source is activated and light is applied to the composition for a time sufficient to effect polymerization thereof and to result in hardening, thus fixedly to maintain the preselected spatial orientation of the bulb 16 and base 12.

Figure 4:
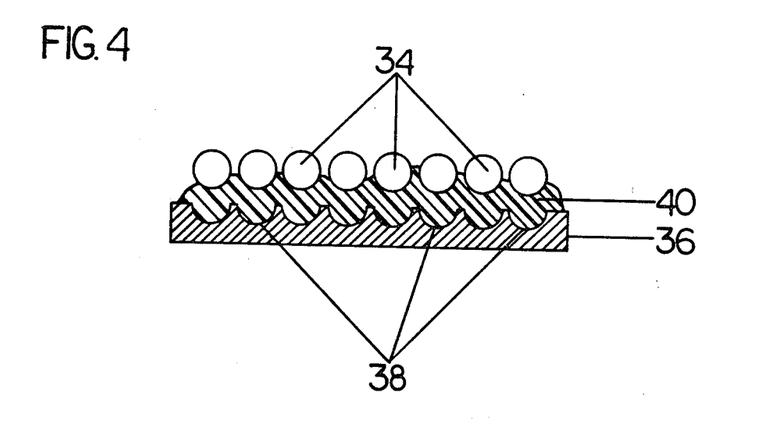
FIG. 4 shows a fixtured array of optical wave guides and a grooved mandrel therefore in cross-section.

Another example of fixturing according to this invention is shown in FIG. 4. It is desired to maintain fixedly a preselected orientation of a collection of fiber optic filaments or other waveguides 34 inter se. Such oriented arrays find wide use in fiber optic devices such as office copiers, cameras, sensors, medical examining equipment and the like. Thus, the fibers 34 may be placed upon a form, mandrel, or base 36 which may, optionally, have spacing means 38 thereupon for effecting a fixed spacing of the fibers. A portion of the actinic light polymerizable materials according to this invention, is applied to the collection of guides which are then repositioned or adjusted as necessary to maintain the preselected orientation. The polymerizable material is then exposed to actinic light for a period of time effective to cause polymerization thereof and to result in the fixed maintenance of the preselected orientation of the guides in the array. It will be appreciated that numerous orientations of such fibers may be preselected and that layers, bundles, and other complex forms thereof may be fabricated. It will also be appreciated that the base or mandrel may assume any convenient shape and that it may either be discarded after fixturing or retained as part of the resulting array assembly.

According to a preferred embodiment, sufficient actinic light curable material is applied to the array of fibers such that, after hardening, the fibers are firmly embedded within the material. Alternatively, it is possible to employ an amount of polymerizable material which is sufficient for maintenance of the spatial orientation of the fibers. After fixturing, the entire collection or array may, if desired, be "potted" in a convenient medium as will be appreciated by those skilled in the art.

Figure 5:
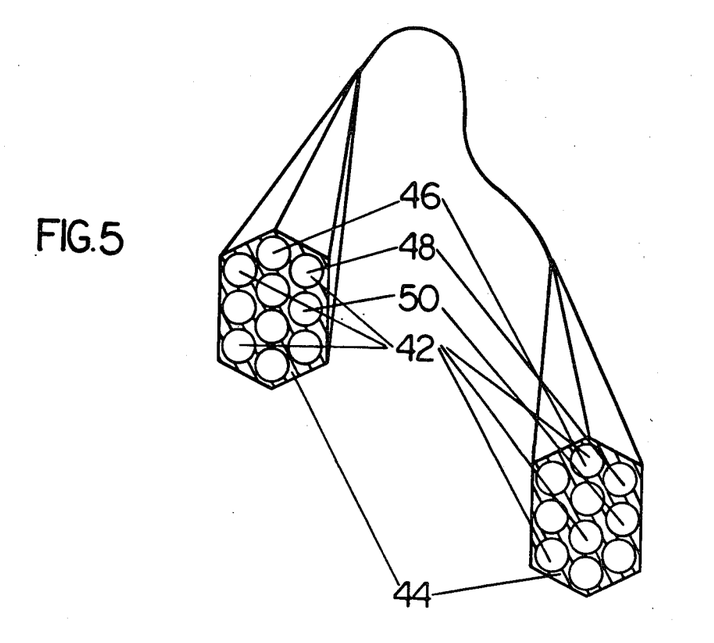
FIG. 5 illustrates an assembly of fiber optic elements.

FIG. 5 shows yet another example of fixturing according to this invention. Optical fibers 42 may be positioned into a preselected spatial orientation such as to form a coherent bundle and then contacted with an actinic light polymerizable composition 44 according to this invention. After exposure of the composition 44 to actinic light and the resulting polymerization thereof, the bundle of fibers may be employed in numerous fiber optic devices. It will be appreciated that the relative spatial orientation of individual fibers such as 46, 48, and 50 may be maintained throughout the length of the fiber bundle through this process. As before, it is preferred to employ sufficient actinic light polymerizable composition to enable embedding of the fiber bundle within such composition. Alternatively, a two step fixturing-potting sequence may be employed.

According to another preferred embodiment, the actinic light curable compositions of this invention are used fixedly to maintain one or a number of portions of a fiber bundle in a preselected spacial relationship. For example, each end of a fiber optic bundle may be secured in such a preselected orientation while leaving the balance of the bundle unsecured. Such procedure minimizes the amount of light curable material needed to maintain the ends in alignment as will be appreciated to those skilled in the art. It will similarly be apparent that this embodiment leads to fiber optic bundles which are flexible along the majority of their length while retaining the preselected orientation at the end or ends.

Figure 6:
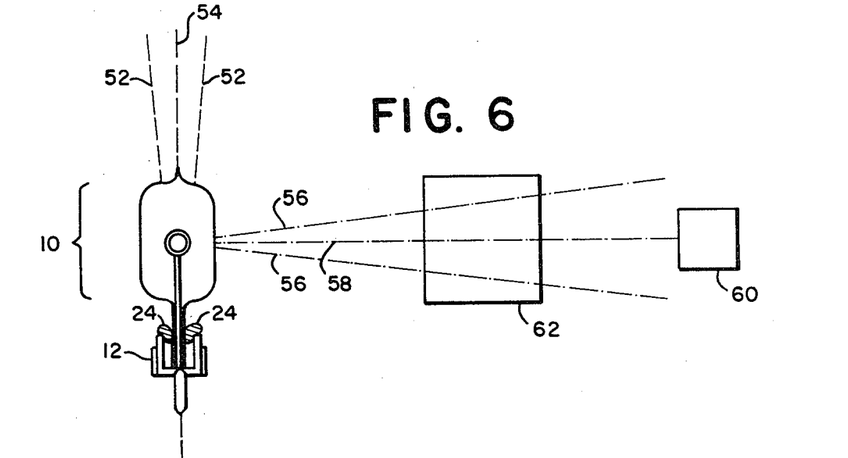
FIG. 6 illustrates a lamp assembly fixturing arrangement in accordance with the invention.

A preferred embodiment of this invention is shown in FIG. 6. A lamp comprising bulb portion 10 and base assembly 12 is to be joined together into a preselected spatial orientation as suggested by orientation line 54. The bulb and base portions 10 and 12 are capable of being joined in a range of orientation as suggested by orientation lines 52. The attainment of preselected orientation 54 will result in light emission from the lamp transiting the bulb portion 10 in a desired geometry with respect to the base portion 12 suggested by transit line 58. Improper joinder of the bulb and base portions results in other light geometries as suggested by transit lines 56.

The attainment of preselected orientation 54 preferably proceeds by contacting the bulb and base with one or more portions of actinic light curable polymerizable composition 24. Light is then caused to transit the bulb portion. This light may either be from an external source or preferably may arise from the activation of the bulb portion 10 itself. The transiting light is caused to be elevated, preferably by causing it to impinge evaluation means 60. Focusing means shown schematically 62 may optionally be employed to facilitate analysis of the transiting light. Reflection means, not shown, may also, optionally, be employed if desired.

Evaluation of the transiting light may comprise measuring its intensity, color, phase, coherency, or any other desired property. Alternatively, the geometry of the light with respect to one or more of the objects may also be determined. In FIG. 6, the geometry of transiting light is desired to be as close to transit line 58 as possible. Thus, the intensity of the light at the evaluation means 60 may be measured while the evaluation means 60 is oriented along line 58. Other procedures may also be employed as will occur to those skilled in the art. The bulb and base portions are then positioned relative to each other in response to the evaluation of the transiting light. In the illustrated embodiment, positioning continues until the intensity of transiting light reaches a maximum at evaluation means 60.

Upon attainment of the preselected spatial orientation of bulb and base portions 10 and 12 as determined by reference to the evaluation of transiting light, the hardenable composition portions 24 are irradiated with actinic light for a time sufficient to substantially harden the portions and to fixedly maintain the preselected spatial orientation 52 with a high degree of accuracy. The transiting light may, optionally be caused to be directed upon the hardenable composition 24 upon attainment of the preselected orientation, this to provide "automatic" curing upon proper alignment.

Figure 7:
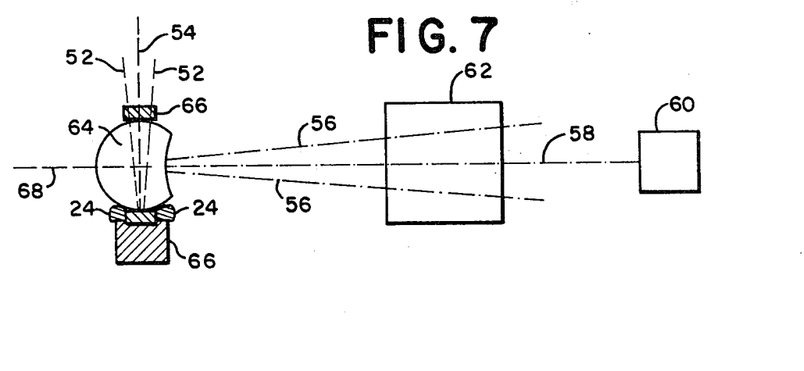
FIG. 7 depicts a fixturing assembly for attaching a lens to a lens holder.

FIG. 7 depicts the fixturing of a lens 64 to a lens holder 66. The preselected spatial orientation 54 of the lens 64 vis-a-vis lens holder 66 is attained from the range of possible orientations 52 by causing light 68 from an external source to transit the lens and impinge upon evaluation means 60. Employment of focusing means 62 is optional. Evaluation of the transiting light, positioning of lens 64 and lens holder 66 in response to the evaluation, and irradiation of polymerizable material 24 follows as discussed in connection with FIG. 6. Accurate alignment of lens 64 and lens holder 66 can be attained to a high degree.

Figure 8:
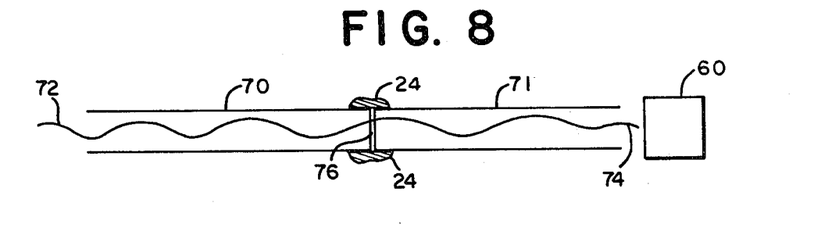
FIG. 8 shows the joining of optical fibers in precise alignment.

Joinder of two optical fibers 70 and 71 is shown in FIG. 8. Precise alignment of the ends of such fibers is necessary to provide minimum loss of optical signal from transmitted light transiting the fiber junction 76. The fibers to be joined 70 and 71 are preferably placed in a jig, not shown, for holding them in approximate alignment and at least one portion of polymerizable material 24 placed about (but not in) the junction. Light 72 is caused to input one of the fibers 70 and to transit fibers 70, junction 74 and the other fiber 71. Exiting light 74 is caused to contact evaluation means 60. The fibers are positioned in response to the evaluation and the polymerizable material 24 hardened by irradiation with actinic light as before. Precise alignment of the fiber ends leading to minimal signal loss due to the junction may be expected from following this process. Non-fiberous optical waveguides may also be joined in accordance with this embodiment.

Those skilled in the art will appreciate that numerous other fixturing and manufacturing processes may benefit from the employment of the novel processes of this invention. Accordingly, waveguiding devices in forms other than fibers may be assembled into arrays in manners similar to those described above. Thus, planar waveguides may be joined or aggregated. Similarly, numerous objects requiring careful control of spatial orientation may be joined together employing the fixturing processes of this invention. For example, these processes may be employed to "tack" together objects prior to final assembly. Thus, such objects may be joined together employing actinic light curable compositions of this invention preparatory to the insertion of other joining means such as bolts, screws, conventional adhesives or even further amounts of light curable adhesives. It is contemplated that any group of two or more objects may be contacted with at least one portion of the actinic light polymerizable compositions of this invention, positioned relative to each other to attain a preselected spatial orientation and irradiated with actinic light for a period of time sufficient to cause polymerization of the composition and fixed maintenance of the preselected orientation.

This invention also contemplates the repair of certain objects, especially waveguides and waveguide arrays. Frequently, such waveguide or waveguide arrays develop pits, cracks, nicks, cuts, or other structural voids on one or more surfaces thereof. Such voids may diminish the performance characteristics of such waveguides or arrays. Accordingly, this invention is drawn to a method of repair of such waveguide arrays having one or more structural voids on a surface thereof. Such repair processes comprise the steps of applying to the void an actinic light polymerizable composition and exposing such composition to actinic light for a period of time effective to polymerize the composition, whereby the void is substantially filled with the polymerized compositions. By judicious choice of the polymerizable composition, good bonding with the waveguide or waveguide array may be had and interference with the optical characteristics of the array minimized.

This repair process is particularly useful in the repair of optical waveguide arrays used in office copiers and the like. Such arrays are frequently nicked by staples, paperclips, and other objects; such nicks and other voids result in imperfections in the operation of the optical systems involved. By applying an actinic light polymerizable composition to the void and by polymerizing the same through exposure of the composition to actinic light for a period of time sufficient to polymerize the composition, the void may be filled and the optical array returned to service.

The actinic light curable compositions useful in the practice of this invention are preferably those disclosed in the application of Koblitz et al entitled Radiation Curable Silaneous Adhesives, filed on Feb. 17, 1981, Ser. No. 233,951 which application is incorporated herein by reference to provide, inter alia a full description of preferred actinic light curable compositions.

It is preferred to employ actinic light polymerizable resins comprising at least 20% by weight of certain polymerizable silanes and related species and up to 80% by weight of a polymerizable ethylenically unsaturated material and an amount of a photosensitizing system effective to cause polymerization of the composition when it is exposed to actinic light. Such compositions may also comprise organic or inorganic fillers and other modificants.

The silanes which are preferred for use in the compositions used in the practice of this invention are any of those silanes which contain functionalities which participate in photochemical polymerization. In general, such silanes have one or more reactive ethylenic unsaturations. Such unsaturations include, for example, vinyl, allyl, "dienyl", "dienyl", acetylenyl, acrylyl, methacrylyl, other acrylic homologs, and many other reactive ethylenic functionalities. Preferably, such silanes belong to the class of acrylosilanes, which class includes methacrylic and homologous species. Such families may be represented by the formula:

I where $R_1$–$R_4$ are the same or different and may be H, alkyl, alkenyl, aryl, aralkyl, alkaryl, alkoxy, vinyl, aryloxy, acyloxy, etc. having from 1 to about 40 carbon atoms and where at least one of $R_1$ $R_4$ is alkyl, aryl, aralkyl, alkaryl having from 1 to about 40 carbon atoms and being substituted with at least one group having formula II:

II where $R_5$ is H, alkyl, alkenyl, or phenyl having from 1 to about 6 carbon atoms.

Another family of silane species which is useful in the compositions used in the practice of this invention include those light polymerizable silanes which have non-acrylic photochemically reactive ethylenic unsaturations. Accordingly, such family may be represented by formula I:

I where $R_1$–$R_4$ have the meanings subscribed to them previously and at least one of $R_1$–$R_4$ has the formula:

$$-R_6-CH=CH_2 \quad\quad\quad (III)$$

where $R_6$ is alkyl, aryl, aralkyl, or alkaryl having from 1 to about 30 carbon atoms. While formula III discloses a terminal ethylenic unsaturation, those skilled in the art will easily recognize that compounds having internal ethylenic unsaturations may also be suitable for the practice of one or more embodiments of the present invention. This family will be recognized to include vinyl, allyl, and other ethylenically unsaturated silanes. It should be appreciated that others of groups $R_1$–$R_3$ may also include one or more of such reactive ethylenic unsaturations.

Those skilled in the art will recognize that the above descriptions of silaneous materials preferred for inclusion in the compositions used in the processes of this invention is, of necessity, limited. Such persons will understand that numerous ethylenically unsaturated silane compounds exist which are photochemically polymerizable and will easily be able to ascertain which of such compounds are suitable for inclusion in one or more preferred embodiments of the invention. Furthermore, mixtures of two or more of such silane compounds may be so employed.

Since most silane compositions available commercially have been treated with one or more inhibitors to suppress autopolymerization during storage, and since such inhibitors have been found to retard or prevent rapid photopolymerization, it may be necessary to remove most or all of such inhibitors from silane species for use in the practice of this invention.

The polymerizable resins preferred for the formulation of the polymerizable compositions used in this invention preferably comprise at least 20% by weight of at least one of the silanes which have been described hereinabove. Alternatively, it is possible for such resins to comprise up to 100% of such silanes as well. Accordingly, amounts of silane varying from about 20% to about 100% by weight are preferred. More preferred are resins employing from about 40% to about 95% by weight of such silanes. Even more preferred are resins having from about 60% to about 90% of such silanes.

It has been found to be especially preferred to employ amounts of silane in the adhesives of this invention which are greater than about 50% by weight. Such adhesives exhibit particularly good physical properties at elevated temperatures. It is even more preferred to employ from about 60% to about 90% of such silanes for high temperature fixturing and other uses.

The polymerizable resins used to formulate the preferred polymerizable compositions of this invention may, in addition to the silane species, also contain up to about 80% of a polymerizable, ethylenically unsaturated material which does not contain silicon. Thus, from 0% to about 80%, and preferably from about 5% to about 60% of such ethylenically unsaturated, polymerizable materials may be added. It is even more preferred to employ from about 10% to about 40% of such compounds. Preferred reactive, ethylenically unsaturated materials for the practice of this invention include the acrylic, methacrylic, ethacrylic, etc. esters of various alcohols and other hydroxyl containing polymers and prepolymers. Also useful, are vinyl, allyl, styryl, "enyl", "dienyl", acetylenyl, and numerous other reactive, ethylenically unsaturated species. Preferred for use for the practice of the invention are the acrylic and lower alkyl acrylic acid esters, such as the acrylates and methacrylates. Preferred among these are the acrylic, methacrylic, etc. esters of bisphenol-A and its epoxy resins, and related materials. The acrylic esters of 2,2-bis(4-hydroxy-2,3,5,6-tetrafluorophenyl)propane are also preferred.

It has been found that certain actinic light curable compositions are especially preferred for use in the fixturing or bonding of fiber optic devices. More particularly, it has been found that the light curable resinous components of certain composite dental restoratives may be so used with excellent results. More particularly, the resins disclosed in U.S. Ser. No. 182,626 filed Aug. 29, 1980 entitled "Visible Light Curable Dental Composition" and Ser. No. 182,624 filed Aug. 29, 1980 entitled "Broad Spectrum Light Curable Dental Composition" both of which are assigned to the assignee of this application and are abandoned are preferred for use in the processes of the present invention to effect the fixturing of fiber optic arrays, bundles, and devices according to the processes of the present invention. The specifications of the foregoing patent applications are incorporated by reference as though fully set forth herein.

Accordingly, such preferred compositions for the fixturing of fiber optic and similar devices comprises blends of binder resins, diluent monomers, and a photosensitizing system. Such blends may, optionally, include pigments, fillers, opacifiers, handling agents, and other modificants as will be appreciated by those skilled in the art.

Binder resins suitable for use in the practice of one or more of the embodiments of this invention include a wide variety of ethylenically unsaturated polymerizable compositions. Preferably, such resins are selected from the class of acrylated polyesters. Thus, the bis-glycidylmethacrylate adduct of bisphenol A (bis-GMA) and its acrylic counterparts are preferred. Alternatively, the adducts of 2,2,3-trimethylhexane diisocyanate with hydroxyalkyl acrylic species are also preferred. Those skilled in the art will appreciate that other acrylated polyesters may also be suitable. Such acrylated polyesters may also be reacted with isocyanates to form urethane useful as binder resins. Thus, bis-GMA may be reacted with a diisocyanate (or other isocyanate) such as hexamethylene diisocyanate, phenylene diisocyanate or a wide variety of other aliphatic and aromatic diisocyanates t provide useful binder resins. The adducts of bis-GMA with hexamethylene diisocyanate has been found to be the best binder resin presently known for use in this invention.

The diluent monomer is added to the compositions of this invention in amounts sufficient to result in polymerizable formulations usually having viscosities between about 5,000 and about 70,000 centipoises, and preferably between about 40,000 and about 60,000 centipoises. Other viscosities may be employed for certain embodiments, however. Such viscosity control will be understood by those skilled in the art to result in moldable, workable, thixotropic materials suitable for a wide range of dental restorative uses. Diluent monomers may be any of a wide range of polymerizable monomers capable of sustaining a photochemically initiated polymerization. More preferably, such diluents may be the di-, tri- and higher acrylic species such as ethylene glycol dimethacrylate, diethylene glycol dimethaerylate, triethylene glycol dimethacrylate, etc., trimethylol propane trimethacrylate, analogous acrylates, and similar species.

While the components of the polymerized blend may be added in any order, it has been found useful and convenient to mix the binder resin and diluent together, to add the photosensitizing system components, and then to blend in the filler, pigments and other optional modifying agents. In practice, the binder resin and diluent are mixed together in a proportion such that the final polymerizable composition will have the desired viscosity. While the relative amounts of binder resin and diluent will vary depending upon their identity and the type, size and amount of optional adducts to be used, ratios of binder resin to diluent of from about 12:1 to about 1:2 and more preferably, of from about 6:1 to about 1:1 are generally employed.

The preferred polymerizable compositions of this invention also comprise an amount of a photosensitizing system effective to cause polymerization of the adhesive when it is exposed to actinic light. Such photosensitizing system may comprise any of those compounds which are capable of initiating such photopolymerization. Thus, the photosensitizing system may comprise sensitizing species for visible, ultraviolet, or other actinic light. For the practice of some embodiments of the invention, such photosensitizing system comprises an alpha diketone together with an amine. Such alpha diketones (also known as alpha-beta diketones) may be any of those alpha diketones capable of initiating photopolymerization in the polymerizable adhesive systems of this invention. Of these, camphoroquinone, benzil, biacetyl, 9,10-phenanthrenequinone, and 1,2-naphthoquinone have been found to be preferred. Most preferred is camphoroquinone. Numerous amines have been found to be useful when joined with alpha diketones in photosensitizing systems. Such amines as tributylamine, tripropylamine, etc. may be employed. Preferred species include the substituted amines such as N,N-dialkylalkanolamines, N-alkyldialkanolamines and trfalkanolamines. N-methyldiethanolamine and N,N-dimethylethanolamine are most preferred. Such combinations of alpha diketones and amines to form photosensitizing systems will be recognized by those skilled in the art to be especially preferred for use in photopolymerizable adhesives which are to be polymerized by visible light.

The adhesives of this invention may also be polymerized by ultraviolet light. For such ultraviolet light polymerization, ultraviolet light sensitizing systems should be included. Those skilled in the art will recognize that numerous ultraviolet light sensitizing systems are known including numerous aromatic, ketonic and other families of compounds. One such family is represented by the formula:

$$R_7-\overset{\overset{\displaystyle O}{\|}}{C}-R_8 \qquad \text{IV}$$

where $R_7$ and $R_8$ may be the same or different and may be alkyl or aryl. Other sensitizers include benzoin alkyl ethers, which are preferred. Thus, the methyl, ethyl, propyl, etc. benzoin ethers may be employed. Benzoin methyl, ethyl, and isopropyl ethers have been found to be preferred. Also preferred, are benzoin ketals such as benzoin dimethylketal and analogous species. These may also be considered to be benzoin alkyl ethers.

According to certain preferred embodiments of this invention, the photosensitizing system may comprise mixtures of ultraviolet and visible light sensitizing systems. Thus, for example, an alpha diketone and amine may be combined with a benzoin ether to form a broad spectrum photosensitizing system. It has been found that the employment of broad spectrum photosensitizing systems is particularly preferred for the fixturing of fiber optic and similar devices. Accordingly, it has been discovered that excellent adhesion to individual fibers of fiber optic bundles may be obtained through the use of such broad spectrum photosensitizing materials.

According to a preferred embodiment of this invention, the photosensitizing system is supplemented by the addition of a polymerization promoter. Such promoter may be of the type that those skilled in the art will recognize is frequently employed in thermal polymerization systems. Accordingly, such promoters may comprise peroxides, metal compounds such as copper (II) acetoacetate, and other radical reaction promoting compounds; peroxides have been found to be preferred. Peroxides which have been found to be preferred include benzoyl peroxide, di-tert-butyl peroxide and others. Accordingly, amounts of peroxide or other species which are effective to promote the polymerization of the polymerizable adhesives of the present invention may be included in the photopolymerization system. When included in the photosensitizing systems of the invention, the promoter species are added in an amount effective to increase substantially the rate of the photopolymerization reaction. In general, promoters may be added in an amount of from about 0.1% to about 2% of the weight of the polymerizable resin.

The photosensitizing systems are present in the polymerizable adhesives of this invention in amounts effective to cause polymerization of the adhesive when the adhesive is exposed to actinic light of suitable wavelength. In general, such photosensitizing systems comprise of from about 0.3% to about 8% of the total weight of the polymerizable adhesive. It is more preferred to employ such photosensitizing systems in amounts of from about 0.4% to about 6% of such total weight. It should be appreciated that the best measure of the appropriate amount of components of a photosensitizing system according to the present invention is that amount which is effective in causing polymerization of the adhesive when such adhesive is exposed to actinic light.

The polymerizable compositions useful in the process of the invention may also comprise inorganic fillers, organic fillers, pigments, colors, dyes, surface active agents, opacifiers, radio-opaqueing agents, and other modificants. Accordingly, it may be preferred in the practice of certain embodiments of this invention to admix the polymerizable adhesives of this invention with various amounts of fillers or other modificants. Thus, the adhesives may be admixed with fillers such as, for example, silica, quartz, etc. in weight ratios of up to about 1:6. It is frequently desirable to add fillers to the adhesives of this invention in amounts sufficient to render the compositions thixotropic so as to promote ease of handling and good physical properties. Accordingly, filled compositions may be formulated having up to about 80% by weight of filler or other modificants. Such filled or otherwise modified compositions are within the scope of this invention.

For certain fixturing processes of the invention, filling of the actinic light polymerizable compositions is preferred. Thus, for fixturing the lamp of FIGS. 1 to 3 a composition having a resin to filler ratio of about 1:3-1:5 is preferred. For fixturing of waveguide arrays such as that of FIGS. 4 and 5, unfilled or sparingly filled compositions (up to about 1:1) are preferred. Even more preferred for the fixturing of waveguide arrays, fiber optic devices, and similar articles are photocurable adhesives which have less than about 10% filler. Still more preferred are those which are unfilled.

In general, the compositions preferred for use in the processes of this invention may be formulated by mixing together the selected components. Accordingly, it is generally necessary only to mix the silaneous species together with the non-silaneous polymerizable compounds (if any) and to add thereto the selected photosensitizing system, along with the optional fillers, pigments, and other modificants. Thereafter, it is usually helpful to degas the formulation and/or allow the formulation to stand for from about 6 hours to about 7 days to allow full homogenization and dispersion of the components of the mixture. Although these compositions are light curable, preparation and storage away from incidental light is usually not necessary due to their remarkable stability to low light levels.

In use, the materials of this invention are simply dispensed as desired to contact the articles to be adhered. The articles are then positioned if necessary to achieve a preselected spatial orientation and the adhesive exposed to light of the appropriate wavelength at a convenient, effective intensity greater than ambient, to attain polymerization. Accordingly, either visible, ultraviolet or broad spectrum light, depending upon the photosensitizing system selected, is directed to the dispensed composition for a time effective to allow the composition to polymerize. This may be done using any convenient light source. Thus, a visible light curing unit, such as the PRISMA-LITE TM unit of the L.D. Caulk Company, may be used to expose visible light curable compositions. The Caulk NUVA LITE ® source may be used for ultraviolet polymerization of the compositions used in the processes of this invention having ultraviolet photosensitizing systems. For those light curable adhesive compositions which have significant photocuring response in both the visible and ultraviolet regions of the spectrum, it is possible to employ either visible light, ultraviolet light, or light having components in both the visible and ultraviolet regions in the spectrum. Additionally, for certain embodiments, it is possible to employ visible light followed by ultraviolet light or ultraviolet light followed by visible light. In general, it is necessary only to expose the compositions of this invention to relatively low levels of irradiation in order to secure polymerization. Thus, typical formulations may be exposed to 0.4 watt/cm2/sec. visible light (400–500 nm) for from about 10 seconds to about 30 seconds to effect cures of up to about 6 millimeters in depth.

While the silaneous adhesive compositions of the Koblitz et. al. invention Ser. No. 233,951 described in summary above, are preferred for use in certain of the fixturing and repairing processes of this invention, those skilled in the art will appreciate that numerous other actinic light polymerizable compositions may also be so employed without deviating from this invention. Accordingly, the adhesive compositions disclosed as the resin components of U.S. Ser. Nos. 182,626 and 182,624, described above, are preferred for use in the fixturing of fiber optic and similar devices. Numerous acrylic, methacrylic, etc., urethane, vinyl, styryl, etc. resins may be so employed above or in combination. Additionally, numerous photosensitizing systems may be employed as desired. The only requirement is that the actinic light polymerizable compositions be capable of rapid and efficient polymerization upon irradiation with non-ambient actinic light.

It is to be emphasized that a major feature of my invention is the ability to adjust the alignment as discussed with respect to FIGS. 6, 7 and 8 and then without securing this position with mechanical means hardening the composition and thereby securing the alignment. Thus, the alignment need never become position stable and non dynamic until the composition is hardened or the instant before hardening. The alignment need thus be maintained for only part of a second and certainly for less than 5 minutes, more preferably less than 1 minute and preferably less than 5 seconds. Alignment need not be maintained mechanically against slow drift or movement because of the rapidity of operation or freezing in position made possible using the present invention.

Insofar as is known, the previously known methods of securing lamp filaments in spatial relation to reflectors did not allow a precision of 1/10,000 of an inch. The previous standard was only 1/1,000 of an inch. Furthermore, because of the procedures used the spatial orientation was permanently set after removal from the calibration means which allowed drift in the fixtures or jigs used to maintain calibration during permanent setting. Using the present invention, the spatial orientation is frozen by hardening the visible light curing composition while the parts are dynamically aligned in the calibrating means (such as shown in FIGS. 6, 7 and 8). The calibration adhering or setting may be only a partial or preliminary cure with a subsequent cure with or without the addition of additional adhesive used in a subsequent or final manufacturing procedure. This is a substantial advance in the art as set forth above.

What is claimed is:

1. A process for accurately joining together a first object and a second object into a preselected spatial orientation comprising:
    contacting said first object and said second object with at least one portion of a polymerizable composition hardenable through irradiation with actinic light,
    causing light to be emitted from at least one of said objects,
    evaluating said light,
    positioning said objects relative to each other in response to said evaluation to attain said preselected spatial orientation; and
    irradiating said portion with actinic light for a time sufficient to cause said composition to polymerize substantially to hardness, fixedly to maintain said preselected spatial orientation to a high degree of accuracy.

2. The process of claim 1 wherein said evaluation comprises measuring the intensity of said light.

3. The process of claim 1 wherein said evaluation comprises measuring the geometry of said light with respect to one or more of said objects.

4. The process of claim 1 wherein said emitted light is said actinic light.

5. The process of claim 1 wherein said objects comprise bulb and base portions of a lamp.

6. The process of claim 1 wherein said objects each comprise an optical fiber or waveguide.

7. The process of claim 6 wherein said emitted light transits each of said optical fibers or waveguides.

8. The process of claim 7 wherein said evaluation comprises measuring the intensity of said transiting light.

9. A process for accurately joining together a first object and a second object into a preselected spatial orientation comprising:
    contacting said first object and said second object with at least one portion of a polymerizable composition hardenable through irradiation with visible light comprising:
    a binder resing,
    a diluent monomer, and
    a photosensitizing system comprising:
        an alpha diketone, and
        an amine reducting agent,
    causing light to be emitted from at least one of said objects,
    evaluating said light,
    positioning said objects relative to each other in response to said evaluation to attain said preselected spatial orientation; and
    irradiating said portion with visible light for a time sufficient to cause said composition to polymerize substantially to hardness fixedly to maintain said preselected spatial orientation to a high degree of accuracy.

10. The process of claim 9 wherein said binder resin is selected from the group consisting of acrylated polyesters, acrylated polyesters reacted with isocyanates, and hydroxyalkyl acrylic species reacted with isocyanates; said alpha diketone is selected from the group consisting of camphoroquinone, benzil, biacetyl, 9, 10-phenanthrenquinone, and naphthoquinone; and said amine is either an N-alkyl dialkanolamine or trialkanolamine.

11. The process of claim 9 wherein said photosensitizing system further comprises a benzoin alkyl ether.

12. The process of claim 9 wherein said evaluation comprises measuring the intensity of said light.

13. The process of claim 9 wherein said evaluation comprises measuring the geometry of said light with respect to one or more of said objects.

14. The process of claim 9 wherein said emitted light is said visible light.

15. The process of claim 9 wherein said objects comprise bulb and base portions of a lamp.

16. The process of claim 9 wherein said objects each comprise an optical fiber or waveguide.

17. The process of claim 16 wherein said emitted light transits each of said optical fibers or waveguide.

18. The process of claim 17 wherein said evaluation comprises measuring the intensity of said light.

19. A process for accurately joining a lamp bulb portion to a lamp base portion into a preselected spatial orientation comprising:
    contacting said bulb and said base portions with at least one portion of a polymerizable composition hardenable through irradiation with visible light,
    causing said bulb portion to emit light, said light transiting said bulb portion and impinging upon light evaluation means,
    evaluating said light,
    positioning said bulb and base portions in response to said evaluation to attain said preselected spatial orientation; and
    irradiating said portion of polymerizable composition with visible light for a time sufficient to cause said polymerizable portion to polymerize substantially to hardness, fixedly to maintain said preselected spatial orientation to a high degree of accuracy.

20. The process of claim 1 wherein said evaluation is continued while said composition is caused to polymerized to substantially said hardness.

21. The process of claim 20 wherein said recited process of causing light to transit at least one of said objects, said evaluation of said light said positioning of said objects and said polymerization to said hardness is carried out within less than about 1 minute.

22. The process of claim 21 wherein said process steps recited in claim 21 are carried out within less than about 5 seconds.

23. The process of claim 9 wherein said evaluation is continued while said composition is caused to polymerize to substantially said hardness.

24. The process of claim 23 wherein said recited process of causing light to transit at least one of said objects, said evaluation of said light said positioning of said objects and said polymerization to said hardness is carried out within less than about 1 minute.

* * * * *